(No Model.)
J. B. CALKINS.
STOCK CAR.
No. 256,877. Patented Apr. 25, 1882.
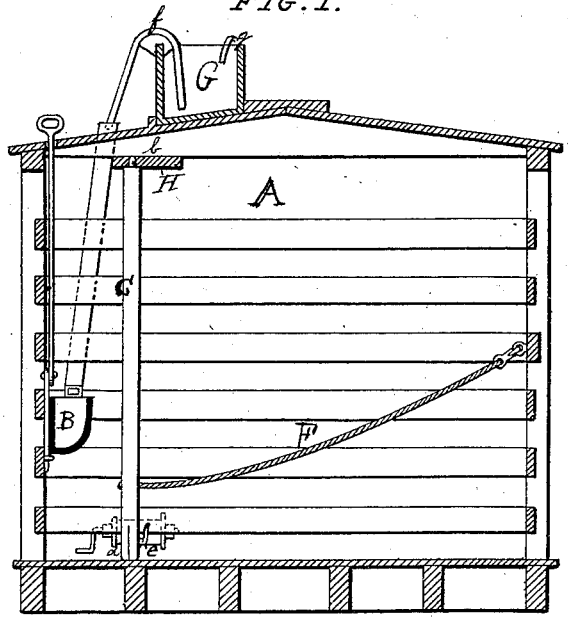
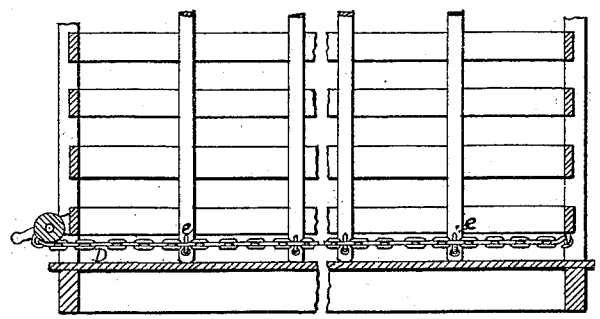
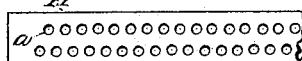
ATTEST:
Gay Calkins
J. C. Byers
INVENTOR:
James B. Calkins

UNITED STATES PATENT OFFICE.

JAMES B. CALKINS, OF PACIFIC, MISSOURI.

STOCK-CAR.

SPECIFICATION forming part of Letters Patent No. 256,877, dated April 25, 1882.

Application filed November 2, 1881. (No model.)

*To all whom it may concern:*

Be it known that I, JAMES B. CALKINS, a citizen of the United States, residing at Pacific, in the county of Franklin, State of Missouri, have invented certain new and useful Improvements in Railroad Stock and Freight Cars, of which the following is a full, clear, and exact description, reference being had to the accompanying drawings and letters of reference thereon, which form a part of the specification.

The object of my invention is to provide a simple and convenient plan to water and feed cattle in a railroad stock-car while in transit any required distance without stopping the train, and to feed ground food mixed with water in the freight and stock car now in use.

In the accompanying drawings, Figure 1 is an end view of car. Fig. 2 is a longitudinal sectional view. Fig. 3 is a sectional view of a plank in the upper part of car, provided with mortises to receive and hold the upper end of partition.

A represents a freight and stock car built as ordinarily.

B is the trough as ordinarily made of wood and lined with zinc or galvanized iron.

C is an adjustable cattle-fastening, two of them being placed close together to inclose the animal's neck, allowing him to lie down, get up, eat or drink, but not to get out of place. The two upper ends are held by being thrust through the mortises $a$ in the plank H in the top of the car. The lower ends are held in place by chain D, that runs the entire length of the car, lying upon the floor. A link of chain D is placed over a hook, $e$, which is attached to the foot of fastenings C, or it may be held in place by a bolt, $d$, attached to the foot of the adjustable cattle-fastenings, and this bolt falling down through a small opening in the floor of car. The chain D is made slack or taut by a small windlass with ratchet-wheel attached at the end and outside of the car. The ropes F are attached to the adjustable cattle-fastenings C as low down as where the knee of the animal will come, running thence along below the belly, then rising up around the hind quarters of the animal, and hooked to the side of car, prevents the animal from being jerked back whenever the train is suddenly started, thereby preventing crowding and squeezing of the animals in the rear part of the car.

G represents a portable tub, in which water from the long rubber hose $g$, reaching forward to the tank, is forced by a force-pump. A quantity of meal is put into the tub sufficient to feed a half-car load. Then the water is let in and the siphon-hose $f$ conveys it to the feed-trough B.

Having fully described my invention, I claim—

1. In railway-cars, the combination of the adjustable cattle-fastenings C, provided with hooks $e$, bolts $d$, the plank H, having mortises $a$, the chain D, and the ropes F, arranged to secure and separate the cattle in the manner set forth.

2. In a railway-car arranged for transporting cattle, the food and water receiving tub G, placed upon the top of car, in combination with the siphon-tube $f$, long flexible hose $g$, and trough B, arranged to supply the cattle in the manner set forth.

JAMES B. CALKINS.

Witnesses:
   J. C. BYERS,
   GAY CALKINS.